US012561983B2

(12) United States Patent
Luszek et al.

(10) Patent No.:  US 12,561,983 B2
(45) Date of Patent:  Feb. 24, 2026

(54) SENSOR PROCESSING METHOD, APPARATUS, COMPUTER PROGRAM PRODUCT, AND AUTOMOTIVE SENSOR SYSTEM

(71) Applicant: Aptiv Technologies AG, Schaffhausen (CH)

(72) Inventors: Moritz Luszek, Dublin (IE); Jan Siegemund, Dublin (IE)

(73) Assignee: Aptiv Technologies AG, Schaffhausen (CH)

( * ) Notice: Subject to any disclaimer, the term of this patent is extended or adjusted under 35 U.S.C. 154(b) by 14 days.

(21) Appl. No.: 18/118,828

(22) Filed: Mar. 8, 2023

(65) Prior Publication Data

US 2023/0306748 A1     Sep. 28, 2023

(30) Foreign Application Priority Data

Mar. 23, 2022    (GB) ...................................... 2204074

(51) Int. Cl.
G06V 20/56          (2022.01)
B60W 40/10          (2012.01)
            (Continued)

(52) U.S. Cl.
CPC ............. G06V 20/56 (2022.01); B60W 40/10 (2013.01); G06T 7/12 (2017.01); G06T 7/70 (2017.01);
            (Continued)

(58) Field of Classification Search
CPC ........ G06V 20/56; G06V 10/25; G06V 10/22; G06V 10/82; B60W 40/10; G06T 7/12; G06T 7/70; G06T 2207/20084; G06T 2207/30252; G06T 3/40; G06T 7/11; G06T 2207/10016; G06T 2207/10028; G06T 2207/20132; G06N 3/02
See application file for complete search history.

(56) References Cited

U.S. PATENT DOCUMENTS

| | | | | |
|---|---|---|---|---|
| 2019/0092235 A1* | 3/2019 | Kim | ....................... | B60Q 9/008 |
| 2019/0259284 A1* | 8/2019 | Khadloya | .............. | G06V 10/25 |
| 2022/0161815 A1* | 5/2022 | Van Beek | ............. | B60W 50/16 |

FOREIGN PATENT DOCUMENTS

| | | | | |
|---|---|---|---|---|
| WO | WO-2021061180 A1 * | 4/2021 | ............... | G06T 3/40 |

OTHER PUBLICATIONS

Combined Search Report and Examination Report issued by the UK Intellectual Property Office in connection with International Application No. GB2204074.5, dated Sep. 16, 2022.

* cited by examiner

*Primary Examiner* — Sath V Perungavoor
*Assistant Examiner* — Tyler B Edwards
(74) *Attorney, Agent, or Firm* — Harness, Dickey & Pierce, P.L.C.

(57)          ABSTRACT

A processing method for processing data from a sensor system, the method including the steps of receiving sensor data acquired from the sensor system including a set of data points associated with a field of view (1) of at least one sensor in an environment. Data points located within one or more areas of interest (2) are selected, the one or more areas of interest being selected based on a set of criteria. The selected data points are then processed to detect objects or perform semantic segmentation within the one or more areas of interest. The one or more areas of interest may be selected based on a scenario determination of a vehicle (10) in the environment.

11 Claims, 3 Drawing Sheets

(51) Int. Cl.
*G06T 7/12* (2017.01)
*G06T 7/70* (2017.01)
*G06V 10/25* (2022.01)

(52) U.S. Cl.
CPC .... *G06V 10/25* (2022.01); *G06T 2207/20084*
(2013.01); *G06T 2207/30252* (2013.01)

SENSOR PROCESSING METHOD, APPARATUS, COMPUTER PROGRAM PRODUCT, AND AUTOMOTIVE SENSOR SYSTEM

CROSS-REFERENCE TO RELATED APPLICATION

This application claims the benefit of Great Britain patent application serial number GB2204074.5 filed on Mar. 23, 2022. The entire contents of which are hereby incorporated by reference herein.

FIELD

The present disclosure relates to a sensor processing method, apparatus, and computer program product. The present disclosure also relates to automotive sensor systems. In particular, the present disclosure concerns automotive grid processing systems and, most particularly, situational aware object detection and semantic segmentation processing methods and systems.

BACKGROUND

Object detection and semantic segmentation processing methods, such as those using convolutional neural networks (CNN), operate on discrete grids with a fixed size. As such, image data from within the receptor range of a sensor system is supplied in the form of a input grid or matrix, having a defined number of cells representing the sensor image. During processing, convolutional filters or kernels are slid over the input data grid in a plurality of strides to produce output data in the form of a feature map. Consequently, the position of each filter moves independently relative to the grid, with convolution operations being applied locally to each block of cells selected by the filter during any one stride step. Accordingly, as will be understood, the larger the input data grid, the more costly the image processing becomes because more filter strides are needed to process the entire grid.

At the same time as the above, depending on the situation, only some areas of the input data grid will be, in practice, interesting for subsequent detection/segmentation processing operations. That is, the input data grid will normally be set so that it is large enough to cover all interesting areas for all potential driving scenarios. For example, in the application of automotive RADAR, LIDAR, or camera image processing, the input data grid will often be set to be large enough to encompass long range object detection in excess of 100 m, for example for driving at high speed on a highway. The system will therefore use a large grid to cover this whole area. However, such a system also needs to be trained and work for city driving and parking scenarios, where shorter-range object detection is needed. Nevertheless, processing overhead remains high in these scenarios. Moreover, a large training data set must also be provided to train the CNN because of the variety of situations that may arise within a large sample area. This is challenging both in terms of the processing cost, but also in terms of the volume of the dataset needed to optimally train the CNN model.

Accordingly, there remains a need to address the above shortcomings in conventional object detection and segmentation methods and systems, such as CNN image processing systems.

SUMMARY

According to a first aspect, there is provided a method for processing data from a sensor system, the method including the steps of: receiving sensor data acquired from the sensor system including a set of data points associated with a field of view of at least one sensor in an environment; selecting data points located within one or more areas of interest, the one or more areas of interest being selected based on a set of criteria; and processing the selected data points to detect objects or perform semantic segmentation within the one or more areas of interest.

In this way, the position and scale of the one or more areas of interest to be processed may be adjusted based on the prevailing scenario according to a set of criteria. For instance, in automotive sensor systems, a set of criteria may be used to identify the prevailing scenario the vehicle is in. As such, processing demands can be minimised by limiting the processing operations to those areas of the original image frame that are of interest for the particular vehicle scenario. In addition to minimising processing demands, algorithm coverage may be also improved by leveraging knowledge about the vehicle's situation. Accordingly, the problem of high computing and training costs associated with processing large areas for object detection/segmentation operations may be addressed by dynamically selecting relevant areas from the original image frame by shifting and scaling based on the situation. Accordingly, the full input dataset does not need to be processed in use. At the same time, training can be limited to a subset of the complete areas to limit the resources needed for training.

In embodiments, the sensor data represents an input grid for an image frame depicting the field of view.

In embodiments, the step of selecting data points located within one or more areas of interest comprises selecting a processing grid as a subset the input grid.

In embodiments, the size and position of the processing grid within the input grid is selected according to the set of criteria. In this way, one or more regions of interest within the larger input dataset or input grid may be selected, with data cells within the selected matrix then being extracted from the surrounding data and delivered to the object detection and segmentation system, such as a convolutional neural network (CNN), for subsequent processing.

In embodiments, the one or more areas of interest are selected from a number of predetermined one or more areas of interest, wherein each predetermined one or more areas is associated with a different set of criteria. The different set of criteria may be derived from one or more vehicle operation inputs. Such vehicle operation inputs may be driver initiated, e.g. driver controlled speed of the vehicle, the driving mode selected, gear selection, yaw/turning rate, steering wheel position, acceleration level, deceleration level, and/or other user input. In this way, different scenarios, identified by a set of criteria, may have different areas of interest associated with them, each having predefined shapes and positions for optimised object detection in that scenario.

In embodiments, the size and position of the one or more areas of interest are selected dynamically according to the set of criteria. In this way, the size and position of the processed areas of interest may be dynamically adjusted based on prevailing conditions. As such, the selection may be varied based on live processing. In addition, in embodiments, a neural network for vehicle state estimation may be used to dynamically select the areas of interest based on all available data including a plurality of sensor inputs to determine the driving situation. For example, a detected high vehicle speed together with guardrails detected by RADAR or camera systems may be used as criteria to indicate a highway scenario. Conversely, a detected low vehicle speed together with parked cars detected by RADAR or camera systems may be used as criteria to indicate a parking situation.

In embodiments, the sensor system is an automotive sensor system and the method further includes the step of determining a scenario of the vehicle in the environment based on one or more of: the speed of the vehicle, the driving mode selected, the gear selection, the yaw rate, steering wheel position, acceleration level, deceleration level, and a user input. In this way, one or more vehicle inputs may be used to determine the vehicle scenario. For example, high speed driving above a speed threshold may be used as criteria to trigger the adoption of one or more areas of interest associated with highway driving. Conversely, speeds below a threshold may be used as criteria to trigger the adoption of one or more areas of interest associated with a parking operation, with the positioning of the processed areas of interest to the forward or rear of the vehicle being determined based on gear selection. Equally, the turning of the steering wheel may trigger the area of interest to be shifted in a corresponding direction for an associated turning operation.

In embodiments, the step of processing the selected data points comprises processing by one of a convolutional neural network, a shifted window transformer, a pointwise machine learning processor, or other locally connected process layers.

In embodiments, the one or more areas of interest are selected based on a scenario determination of the vehicle in the environment.

According to a further aspect, there is provided a processing apparatus for processing data from a sensor system, including: an input for receiving sensor data acquired from the sensor system including a set of datapoints associated with a field of view of at least one sensor of a vehicle in an environment; a selection module for selecting data points located within one or more areas of interest, the one or more areas of interest being selected based on a set of criteria; and a processor for processing the selected data points to detect objects or perform semantic segmentation within the one or more areas of interest. In this way, an apparatus is provided for implementing the above method.

In embodiments, the sensor data represents an input grid for an image frame depicting the field of view.

In embodiments, the selection module selects data points located within one or more areas of interest by selecting a processing grid as a subset the input grid.

In embodiments, the selection module is configured to select the size and position of the processing grid within the input grid according to the set of criteria. As such, the selection module may designate the one or more areas of interest within the larger input data set/input grid based on a prevailing vehicle situation indicated by the set of criteria. For example, a processing grid covering areas of interest may be set with a length and width that is twice the largest object to be identified. This may provide tolerance for detecting objects of different sizes, as well as providing sufficient context for effective object detection and semantic segmentation. For instance, for a highway driving scenario, the width of the processing grid may be set to be at least the road width.

In embodiments, the selection module is configured to select the one or more areas of interest from a number of predetermined one or more areas of interest, wherein each predetermined one or more areas of interest is associated with a different set of criteria. In this way, object detection may be optimised for instance, for specific vehicle scenarios, such as highway driving or parking.

In embodiments, the selection module is configured to select the size and position of the one or more areas of interest dynamically according to the set of criteria.

In embodiments, the selection module includes a determination input for receiving a scenario determination based on the set of criteria for designating the areas of interest. In this way, the selection module may receive one or more inputs from controllers in the vehicle to determine the prevailing scenario.

In embodiments, the sensor system is an automotive sensor system and the apparatus further includes a determination module for generating the scenario determination based on one or more of: the speed of the vehicle, the driving mode selected, the gear selection, the yaw rate, steering wheel position, acceleration level, deceleration level, and a user input. In this way, one or more vehicle operation inputs may be used to select an optimised one or more areas of interest based on awareness of the prevailing situation.

In embodiments, the processor comprises one of a convolutional neural network, a shifted window transformer, a pointwise machine learning processor, or other locally connected process layers.

In embodiments, the one or more areas of interest are selected based on a scenario determination of the vehicle in the environment.

According to a further aspect, there is provided a computer program product including instructions which, when the program is executed by a computer, cause the computer to carry out the above method steps.

According to a further aspect, there is provided a non-transitory computer readable medium including instructions, which when executed by a processor, cause the processor to execute the above method.

According to a further aspect, there is provided a method of training a machine learning system for a sensor system, the method including the steps of: (i) selecting one or more training areas of interest for a predetermined scenario, wherein the training areas of interest are associated with a subset of data points within sensor data representing a field of view of at least one sensor in an environment; (ii) generating a training dataset from a plurality of sample frames associated with fields of view of the at least one sensor during the predetermined scenario by selecting one or more training areas of interest for each sample frame; and (iii) training the machine learning system using the training dataset. In this way, training can be limited to a subset of the complete input sensor data to minimise the processing resources needed to develop an optimised model. At the same time, the reduced training processing area allows for a more focused object detection training dataset. For example, training may be done with objects in convenient areas of an image frame, and the resultant object detection can be moved to target different areas or regions of interest in practice. This effectively allows a better trained resultant model to be achieved, which is capable of effective operation in a broader range of scenarios.

In embodiments, the step of selecting the training areas of interest includes selecting the size and position of the one or more areas of interest within the field of view of at least one sensor according to the predetermined scenario. In this way, the configuration of the training areas of interest may be selected for optimising object detection, whilst minimising computational overhead. For example, a processing grid covering the one or more areas of interest may be adjusted to the needs of the relevant task.

In embodiments, the step of selecting the training areas of interest includes selecting a processing grid as a subset of an input grid representing an image frame associated with the predetermined scenario. In this way, a training processing grid may be configured based on identifying the parts of the input image frame that are most likely to contain relevant information during the specified scenario, such as a vehicle driving scenario.

In embodiments, the method further includes repeating steps (i) to (iii) for further predetermined scenarios. In this way, the model may be trained for a number of different scenarios.

In embodiments, the one or more predetermined vehicle scenarios include one or more of: highway driving, parking, reverse parking, forward parking, parallel parking, city driving, and cross-traffic turning.

According to a further aspect, there is provided an automotive sensor system for a vehicle, the system including: at least one sensor for generating sensor data including a set of datapoints associated with a field of view of the vehicle in an environment; an input for receiving the sensor data; a selection module for selecting data points located within one or more areas of interest, the one or more areas of interest being selected based on a set of criteria; and a processor for processing the selected data points to detect objects within the one or more areas of interest. In this way, an improved automotive sensor system may be provided which has less computational overhead associated with its processing steps, such as image processing operations. This thereby allows for, for example, implementation on embedded devices, rather than necessitating high powered general processing capabilities.

In embodiments, the automotive sensor system further includes a determination module for generating a scenario determination based on the set of criteria including one or more of: the speed of the vehicle, the driving mode selected, the gear selection, the yaw rate, steering wheel position, acceleration level, deceleration level, and a user input. In this way, the system may determine the current vehicle scenario based on one or more vehicle control inputs.

In embodiments, the determination module is connected to one or more vehicle electronic control units for receiving scenario determination input data for generating the scenario determination. In this way, the system may receive control inputs from other controllers within the vehicle.

In embodiments, the at least one sensor includes a RADAR, LIDAR sensor, or a camera.

BRIEF DESCRIPTION OF DRAWINGS

Illustrative embodiments will now be described with reference to the accompanying drawings in which.

DETAILED DESCRIPTION

Figure 1:
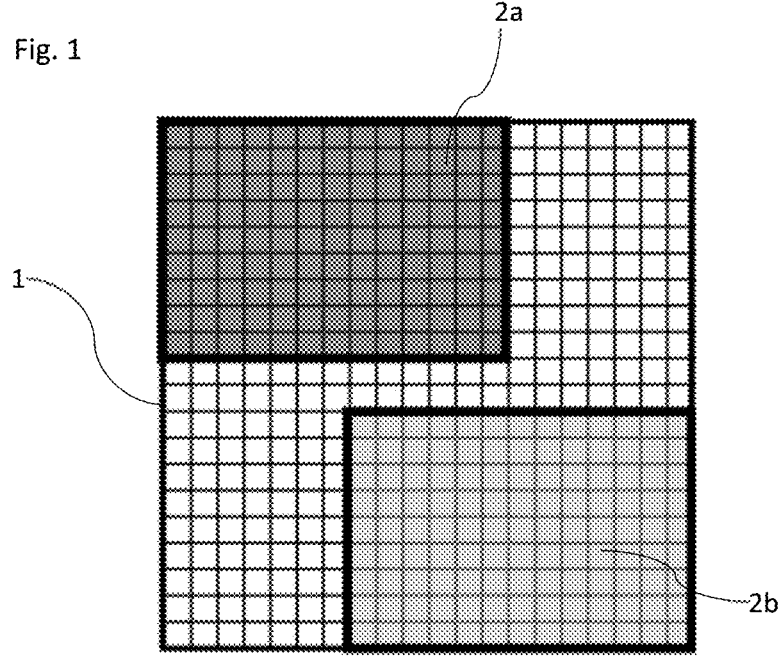
FIG. 1 is a schematic illustration of an input grid and two processing grid variants.

FIG. 1 is a schematic illustration of a input grid 1 used for representing an image frame depicting a field of view of at least one sensor of a vehicle in an environment. For example, a vehicle's RADAR sensor system may comprise an array of RADAR sensors, which together may provide sensor data including a set of data points for a field of view around the vehicle. This may be used, for instance, to generate a 360-degree radar image of the vehicle's surroundings. Image frames from this may be output as a cartesian grid for subsequent processing. In conventional image processing systems, the complete input grid 1 would be processed, for example through one or more convolutional layers of a convolutional neural network (CNN). However, in embodiments, a subset of the cells may be selected from the input grid 1 as a as areas of interest designated by processing grids 2a and 2b. Only the selected subset is then processed through the CNN. As such, the computational overhead is reduced by minimising the size of the grid matrix needing to be processed. Importantly, this benefit is leveraged by selecting a processing grid's size, shape and position within the input grid based on the regions of interest within the image frame for a particular scenario. That is, in FIG. 1, two processing grid variants are shown, 2a and 2b, and one or the other of these may be selected for processing depending on the needs of the particular driving scenario the vehicle is in.

Figure 2:
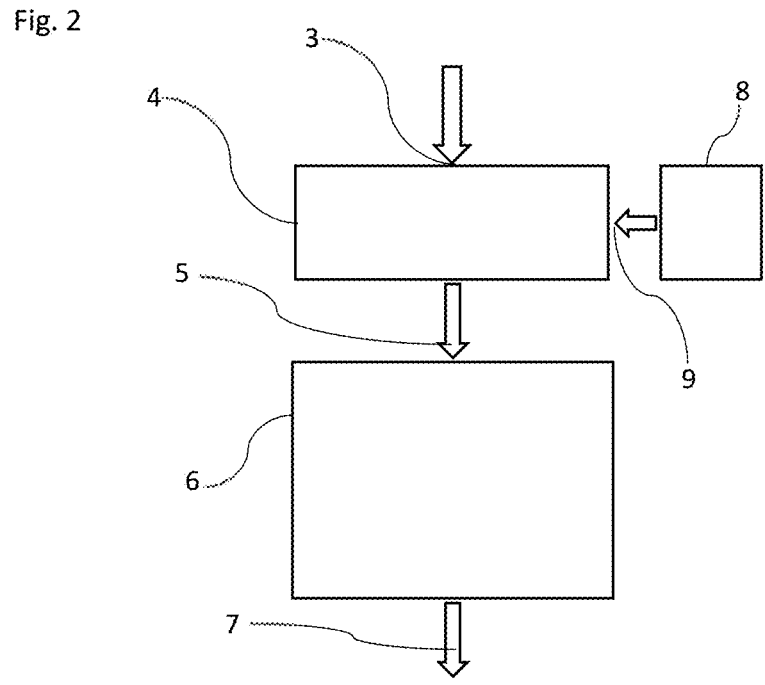
FIG. 2 is a schematic illustration of an image processing apparatus for an automotive sensor system according to an embodiment.

In this connection, FIG. 2 is a schematic illustration of an processing apparatus for an automotive sensor system according to an embodiment. A selection module 4 is provided for selecting a processing grid, a determination module 8 is provided for generating the scenario determination based on a set of criteria, and a CNN 6 is provided for processing the selected processing grid. It will be understood that the selection module 4, determination module 8, and CNN 6 may be implemented using one or more microprocessors, for instance as part of an embedded device or an automotive controller unit.

The selection module 4 is provided with an input 3, through which the sensor data is received. For example, in embodiments, the input 3 may receive RADAR, LIDAR, or camera sensor data which could be processed to generate a 360-view image frame. At the same time, the selection module 4 includes a determination input 9 for receiving a scenario determination from the determination module 8.

The determination module 8 generates the scenario determination based on status inputs received from vehicle controllers elsewhere in the vehicle. In embodiments, the inputs may include one or more of: the speed of the vehicle, the driving mode selected, the gear selection, the yaw rate, and steering wheel position, acceleration level, deceleration level, a user input.

In use, the scenario determination from the determination module 8 is input to the selection module 4 and used to select a processing grid 2a,2b as a subset of the input grid 1. Once selected, the data 5 for that selected processing grid is extracted from the surrounding input grid data and fed to an input of the CNN 6, where it is fed through at least one convolutional layer. The CNN 6 then outputs output data 7 which may be used for subsequent operations, such as advanced driver assistance systems (ADAS), automated parking or autonomous driving capabilities.

Accordingly, with embodiments, the processing grid can be shifted and scaled to the position where it is needed, depending on the use case, while the rest of the input grid is not computed.

In this connection, when parking, typically three different situations or scenarios are relevant: (i) looking for a parking space, (ii) forward parking; and (iii) backward parking.

Figures 3, 4:
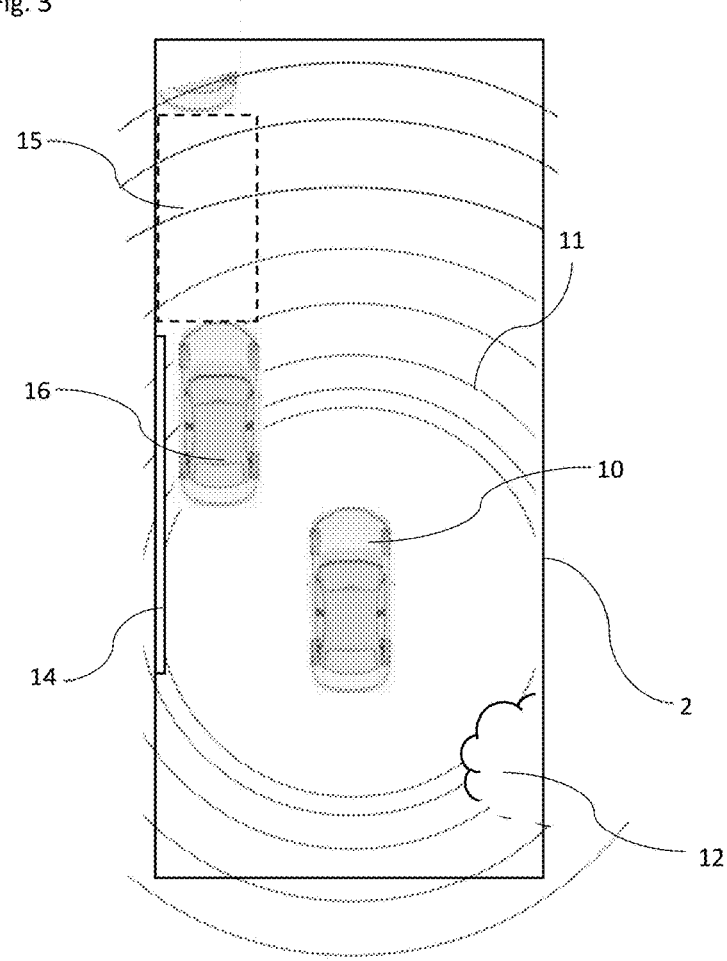
FIG. 3 shows a vehicle incorporating an automotive sensor system in a first parking scenario.
FIG. 4 shows a vehicle incorporating an automotive sensor system in a second parking scenario.

FIG. 3 shows a vehicle 10 incorporating an automotive sensor system in a first parking scenario where the vehicle 10 is looking for a parking spot 15. In this scenario, a larger viewing distance to the front and sides is needed to identify a vacant parking slot 15 by either detecting other cars 16 or the free space. As such, the processing grid 2 is selected to cover these areas, rather than the total field of view of the RADAR signal 11. For example, in embodiments, the scenario determination module 8 may detect a vehicle speed below a lower threshold, for example below 20 kph, and determine this indicates a parking operation is under way. The processing grid 2 is therefore selected accordingly. Subsequent processing by the CNN 6 is consequently limited to the region of interest defined by the processing grid 2, thereby minimising computational overhead, whilst still allowing object detection for identifying other cars 16, walls 14, and bushes 12, and the like. It will also be understood that whilst the above applies to a forward parking operation, if a reverse gear is selected, the processing grid 2 may be shifted backward to focus on these regions instead.

FIG. 4 shows the vehicle 10 in a second parking scenario where a parking spot 15 is selected. In this scenario, the larger processing grid shown in FIG. 3 is not needed anymore. Instead, only a much smaller distance to the front/back/sides of the vehicle 10 needs to be processed. Therefore, a smaller, more centred, processing grid 2 is used. Equally, in some embodiments, the determination module 8 may receive scenario data indicating whether the parking spot 15 is to the left or right, for instance by receiving indicator data. In such a case, the processing grid 2 may be limited to the respective side, thereby avoiding the need to process data associated with the non-parking side.

In another parking scenario example, the processing grid may be selected to be +/−10 m in each direction from the sensor origin. To look out for a parking space, the processing grid may be shifted to $x \in [0,20]$, $y \in [-10,10]$, and when reversing or having passed the parking space, the grid may be shifted to $x \in [-20,0]$, $y \in [-10,10]$. When moving into the parking slot it may then be shifted back to $x \in [-10,10]$, $y \in [-10,10]$ to cover front and back. As a result, for the same compute resources, a vehicle parking function may identify free parking spaces twice the distance ahead, as compared to a fixed grid approach. In addition, the rear object detection when reverse parking may also be doubled, again with no additional compute cost.

Figure 5:
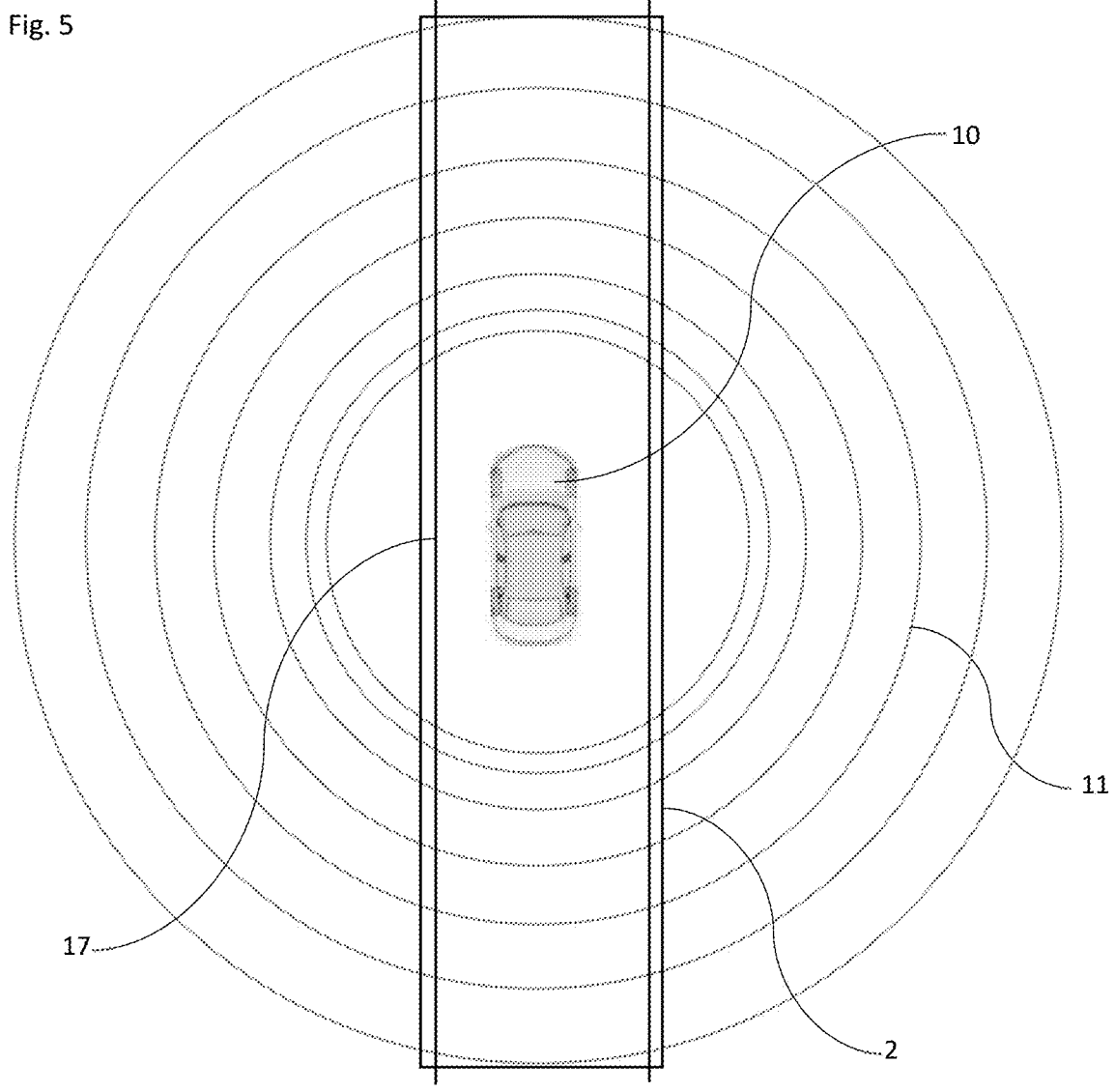
FIG. 5 shows a vehicle incorporating an automotive sensor system in a highway scenario.

FIG. 5 shows the vehicle 10 in a highway scenario. In this case, a large longitudinal range is needed for the processing grid 2 due to the higher vehicle speed. At the same time, the selected processing grid 2 may be relatively narrow in a lateral dimension because space is limited by the width of the road guardrails 17. Accordingly, in embodiments, the scenario determination module 8 may detect when the vehicle speed is above a higher threshold, for instance at speeds higher than 60 kph, and determine this indicates the vehicle is in a highway driving scenario. This may then trigger the application of the long, narrow processing grid shown in FIG. 5.

In city driving scenarios, for instance at speeds between 20-60 kph, a high longitudinal range is less important. This is because, for example, the vehicle speed is lower and therefore the need to identify distant objects is reduced. At the same time, because of the proximity of surrounding objects, unobstructed views are typically limited to much shorter distances. However, if the vehicle is turning, for example as indicated by the yaw rate, a much larger lateral range is required. Accordingly, the scenario determination module 8 may receive inputs for identifying these different scenarios and dynamically change the processing grid variant based on the prevailing needs.

With embodiments, the selected subset of the input grid is shifted and scaled to focus on the region of interest for any particular scenario. Therefore, the larger input grid which covers all eventualities does not need to be processed. Furthermore, training can be limited to a subset of the complete input grid to thereby limit the resources needed for training. Consequently, embodiments provide for increased algorithm coverage and reduce compute power requirements by leveraging knowledge about the situation and adjusting the processing grid position and scale accordingly.

In this respect, it will be understood that, when working on a grid coordinate system, the size of detected objects or structures do not change based on their distance or position within the grid matrix. For example, taking $x \in \mathbb{R}^{H \times W \times C1}$ as an example cartesian grid input to the convolution function F. Typically, x is padded so that an equally sized output is generated $y = F(x)$ with $y \in \mathbb{R}^{H \times W \times C2}$. As convolutions are shift invariant, they thereby perform the same operation regardless of the position within the processing grid. Consequently:

$$F(x)[100:H-100,0:W-10] \approx F(x[100:H-100,0:W-10])$$

The only differences will be on the edges of the grid due to padding. The padding can be ignored, or the grid may be padded and cut later, with the padding lying outside the area of interest. As such:

$$F(x[100-padding:H-100+padding,0:W-10+padding])$$
$$[padding:H-200+padding,0:W-10]==F(x)[100:$$
$$H-100,0:W-10]$$

Due to pooling and stacking of multiple layers within the CNN, information contained in an image frame can travel further than single filter width. As such, object detection is often improved when there is a bigger context. Nevertheless, the processing grid 2 may be selected in such a way that the context for a particular scenario is retained for subsequent processing. Accordingly, the processing grid may be shifted and scaled to reduce computing overhead, without loss of object detection/segmentation performance. For example, in the highway driving scenario discussed above, the processing grid 2 may be scaled and positioned to have at least the road width and a length larger than twice the largest expected object for detection. This thereby allows sufficient data to be maintained from the original input grid to avoid compromising object detection/segmentation performance.

Following the above, advantageously, it is also sufficient to train the CNN using a training processing grid that that is sized to cover only the relevant objects/structures and adjacent context for a particular scenario. Training processing grids may thereby be chosen so that there are no blind spots or otherwise problematic areas in the training area. Furthermore, the training processing grid can also typically be much smaller than a conventional input grid covering all relevant areas. Once the training processing grid is selected, a training dataset can be generated from a plurality of sample image frames depicting sensor fields of view during the predetermined vehicle scenario by selecting training processing grids for each sample image frame. These can then be processed to train the CNN. This thereby saves on compute power and memory consumption during training. At the same time, because the size of objects or structures do not change within the cartesian grid, training performed for one focused scenario may be used in practice for other focused scenarios. For instance, training for parking slot detection on the left of the vehicle will be relevant to parking scenarios on the right. Accordingly, embodiments thereby provide for a more efficient training process.

Accordingly, with the above, both more efficient CNN image processing and training may be achieved by shifting and scaling the processing grid to focus on the needs of the particular scenario, and the different object detection/semantic segmentation sub-tasks associated with that scenario. Performance is thereby improved, and the known limitations of fixed grid approaches are mitigated. At the same time, because the processing grid is selected before being input into the CNN, the CNN structure itself is unchanged. Accordingly, embodiments may be implemented using common hardware accelerators.

It will be understood that the embodiments illustrated above show applications only for the purposes of illustration. In practice, embodiments may be applied to many different configurations, the detailed embodiments being straightforward for those skilled in the art to implement.

For example, although in the above illustrative examples, a single processing grid has been selected from an input grid, it will be understood that the selection may also be implemented by selecting data points located within one or more areas of interest within the field of view provided by the sensor data.

The invention claimed is:

1. A method for processing data from a sensor system, the method comprising the steps of:
 receiving sensor data acquired from the sensor system including a set of data points associated with a field of view of at least one sensor in an environment;
 determining a scenario from one or more driver-initiated vehicle operation inputs;
 selecting the position and size of one or more areas of interest in the field of view based on the determined scenario;
 processing data points of the set of data points in the one or more areas of interest to detect objects or perform semantic segmentation within the one or more areas of interest; and
 wherein the object detection or semantic segmentation is dependent on the one or more driver-initiated vehicle operation inputs and whether the scenario determined from the one or more driver-initiated vehicle inputs is highway driving, parking, reverse parking, forward parking, parallel parking, city driving, or cross-traffic turning.

2. The method according to claim 1, wherein the sensor data represents an input grid for an image frame depicting the field of view, wherein the step of selecting the position and size of the one or more areas of interest comprises selecting a processing grid as a subset the input grid, and wherein the size and position of the processing grid within the input grid is selected according to the determined scenario.

3. The method according to claim 1, wherein the sensor system is an automotive sensor system and the one or more driver-initiated vehicle operation inputs are based on one or more of: the speed of the vehicle, the driving mode selected, the gear selection, the yaw rate, steering wheel position, acceleration level, deceleration level, and a user input.

4. A processing apparatus for processing data from a sensor system, comprising:
 an input for receiving sensor data acquired from the sensor system including a set of datapoints associated with a field of view of at least one sensor in an environment;

a determination module for determining a scenario from one or more driver-initiated vehicle operation inputs;
 a selection module for selecting the position and size of one or more areas of interest in the field of view based on the determined scenario;
 a processor for processing the data points of the set of data points in the one or more areas of interest to detect objects or perform semantic segmentation within the one or more areas of interest; and
 wherein the object detection or semantic segmentation is dependent on the one or more driver-initiated vehicle operation inputs and whether the scenario determined from the one or more driver-initiated vehicle inputs is highway driving, parking, reverse parking, forward parking, parallel parking, city driving, or cross-traffic turning.

5. The processing apparatus according to claim 4, wherein the sensor data represents an input grid for an image frame depicting the field of view, wherein the selection module selects the position and size of the one or more areas of interest by selecting a processing grid as a subset the input grid, and wherein the selection module is configured to select the size and position of the processing grid within the input grid according to the determined scenario.

6. The processing apparatus according to claim 4, wherein the sensor system is an automotive sensor system and the one or more driver-initiated vehicle operation inputs comprise on one or more of: the speed of the vehicle, the driving mode selected, the gear selection, the yaw rate, steering wheel position, acceleration level, deceleration level, and a user input.

7. The processing apparatus according to claim 4, wherein the processor comprises one of a convolutional neural network, a shifted window transformer, a pointwise machine learning processor, or other locally connected process layers.

8. The processing apparatus according to claim 4, wherein the position and size of one or more areas of interest are selected based additionally on a scenario determination of the vehicle in the environment.

9. A computer program product comprising instructions which, when the program is executed by a computer, cause the computer to carry out the steps of the method according to claim 1.

10. An automotive sensor system for a vehicle, the system comprising:
 at least one sensor for generating sensor data including a set of datapoints associated with a field of view of the vehicle in an environment;
 an input for receiving the sensor data;
 a determination module for determining a scenario from one or more driver-initiated vehicle operation inputs;
 a selection module for selecting the position and size of one or more areas of interest in the field of view based on the determined scenario;
 a processor for processing the data points of the set of data points in the one or more areas of interest to detect objects or perform semantic segmentation within the one or more areas of interest; and
 wherein the object detection or semantic segmentation is dependent on the one or more driver-initiated vehicle operation inputs and whether the scenario determined from the one or more driver-initiated vehicle inputs is highway driving, parking, reverse parking, forward parking, parallel parking, city driving, or cross-traffic turning.

11. The automotive sensor system according to claim 10, wherein the one or more driver-initiated vehicle operation inputs comprise one or more of: the speed of the vehicle, the driving mode selected, the gear selection, the yaw rate, steering wheel position, acceleration level, deceleration level, and a user input.

* * * * *